(12) United States Patent
Lee

(10) Patent No.: US 7,694,879 B2
(45) Date of Patent: Apr. 13, 2010

(54) REMOTE CONTROLLER WITH HANDS-FREE FUNCTION FOR PORTABLE TERMINAL

(75) Inventor: Yang-Un Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 934 days.

(21) Appl. No.: 11/453,942

(22) Filed: Jun. 15, 2006

(65) Prior Publication Data

US 2007/0002187 A1    Jan. 4, 2007

(30) Foreign Application Priority Data

Jun. 15, 2005    (KR) ...................... 10-2005-0051405

(51) Int. Cl.
*G06K 15/00* (2006.01)
*G06K 7/10* (2006.01)

(52) U.S. Cl. .................................. 235/383; 235/472.01

(58) Field of Classification Search ................. 235/381, 235/380, 375, 383, 472.01, 472.02, 472.03, 235/486, 487; 600/300, 365
See application file for complete search history.

(56) References Cited

U.S. PATENT DOCUMENTS

| | | | |
|---|---|---|---|
| 2002/0175930 A1 * | 11/2002 | Kolde et al. ................. | 345/705 |
| 2003/0208110 A1 * | 11/2003 | Mault et al. ................. | 600/300 |
| 2004/0102227 A1 * | 5/2004 | Schlegel ................... | 455/569.1 |
| 2004/0121819 A1 * | 6/2004 | Vogel ....................... | 455/569.2 |
| 2005/0104742 A1 * | 5/2005 | Phifer ..................... | 340/825.69 |
| 2006/0176660 A1 * | 8/2006 | Amiri ....................... | 361/683 |
| 2008/0313574 A1 * | 12/2008 | Aravamudan et al. ....... | 715/854 |

FOREIGN PATENT DOCUMENTS

| | | |
|---|---|---|
| JP | 05-091584 | 4/1993 |
| JP | 05-327844 | 12/1993 |
| JP | 11-098590 | 4/1999 |
| JP | 2002-271459 | 9/2002 |
| JP | 2005-151093 | 6/2005 |
| KR | 10-2005-0022113 | 3/2005 |

* cited by examiner

*Primary Examiner*—Thien M Le
(74) *Attorney, Agent, or Firm*—The Farrell Law Firm, LLP

(57) ABSTRACT

Disclosed is a remote controller for a portable terminal which can perform a hands-free function and control the channel selection and the volume of the portable terminal for watching television (TV) and moving pictures. The remote controller with a hands-free function for a portable terminal, the portable terminal including a liquid crystal display (LCD) for watching TV and moving pictures, a speaker unit capable of controlling the volume of the portable terminal, and a microphone unit, the remote controller including a connecting section for connecting with the portable terminal and a remote controller device having a hands-free unit and having an end for attaching to the connecting section, the remote controller device selecting channels for watching TV and moving pictures of the portable terminal and for controlling the volume of the portable terminal.

9 Claims, 3 Drawing Sheets

REMOTE CONTROLLER WITH HANDS-FREE FUNCTION FOR PORTABLE TERMINAL

PRIORITY

This application claims priority to an application entitled "REMOTE CONTROLLER WITH HANDS-FREE FUNCTION FOR PORTABLE TERMINAL" filed with the Korean Intellectual Property Office on Jun. 15, 2005 and assigned Ser. No. 2005-51405, the contents of which are incorporated herein by reference.

BACKGROUND OF THE INVENTION

1. Field of the Invention

The present invention relates to a remote controller with a hands-free function for a portable terminal, and more particularly to a remote controller for a portable terminal which can perform a hands-free function and control channel selection and volume levels of the portable terminal for watching TV and moving pictures.

2. Description of the Related Art

In general, a "portable communication device" refers to an electronic device that a user can carry to perform wireless communication with a desired source. The portable communication device refers to a Hand-Held Phone (HHP), a Cordless Telephone-2 (CT-2) cellular phone, a digital phone, a Personal Communication System (PCS) phone, and a Personal Digital Assistant (PDA).

For example, radio terminals may be classified into various categories according to their appearance, such as a bar-type radio terminal, a flip-type radio terminal and a folder-type radio terminal. A bar-type radio terminal refers to a device having a single bar-shaped housing. A flip-type portable communication device refers to a device in which a flip or a cover is rotatably mounted to a bar-shaped housing by a hinge unit. A folder-type communication device refers to a manner in which a folder is rotatably connected to a single bar-shaped housing by a hinge unit. A slide-type radio terminal refers to a manner in which a slide housing is slid by a half of the length thereof, opposite to the body housing.

Although mobile phones were originally used only for voice communication, they are now being used to provide data communications. Moreover, mobile communication service providers have recently begun to provide digital multimedia content so that news, banking, electronic commercial trade, games, and moving pictures can be watched by using a radio Internet mobile phone.

Recently, in portable terminals in which radio signals (e.g., AM, FM, TV) can be received by terminal, TV can also be watched through a liquid crystal display (LCD) of the terminal, and various data such as MP3 music can be downloaded from the Internet in an audio file format (e.g., with an MP3 file extension) and can be stored in a memory device in the portable terminal to be reproduced when needed. Moving pictures can also be downloaded to be viewed through the LCD of the terminal.

However, according to the conventional portable terminals, if a terminal is called (i.e., receives a telephone call) when a user watches TV or moving pictures through the terminal, the user should press a TV watching and music listening canceling button, and then after pressing a talk button, the user can engage in the telephone call.

Further, according to the conventional portable terminals, after positioning a terminal on a cradle, a user can press a channel conversion button provided in the terminal if he wants to convert the channels when watching TV or moving pictures. In addition, if the user wants to control the volume, the user must press a volume controlling button located on the terminal, which can inconvenience the user.

Further, in order to solve the above-mentioned inconvenience, some conventional terminals include a hands-free unit so that they need not be held to the head of a user when talking and enable a user to communicate with a terminal wirelessly at a close range.

The hands-free unit includes a receiving ear phone, a transmitting microphone, and a key pad having a plurality of keys performing an automatic dialing function which can be disabled when talking.

However, although the hands-free unit can be used at a close range as a talking function, a separate remote controller function is not provided. Therefore, should a channel conversion and a volume control of the terminal need to be performed, the terminal must be manipulated by a user. Further, since the hands-free unit is a separate unit which requires a separate storage box when carried, the part cost increases and the possibility of loss is high.

SUMMARY OF THE INVENTION

Accordingly, the present invention has been made to solve the above-mentioned problems occurring in the prior art, and an object of the present invention is to provide a remote controller for a portable terminal which can perform a hands-free function and control channel selection and the volume levels of the portable terminal to watch TV and moving pictures.

Another object of the present invention is to provide a remote controller for a portable terminal which can be easily carried, can reduce cost by excluding a separate storage box and can prevent the loss thereof.

In order to accomplish these objects, there is provided a remote controller with a hands-free function for a portable terminal including a liquid crystal display (LCD) for watching TV and moving pictures, a speaker unit capable of controlling the volume of the portable terminal, and a microphone unit, the remote controller including a connecting section provided in the portable terminal and a remote controller device having a hand-free unit and having an end for attachment to the connecting section, the remote controller device controlling channel selection for watching TV and moving pictures using the portable terminal and controlling a volume level of the terminal.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings.

Figure 1:
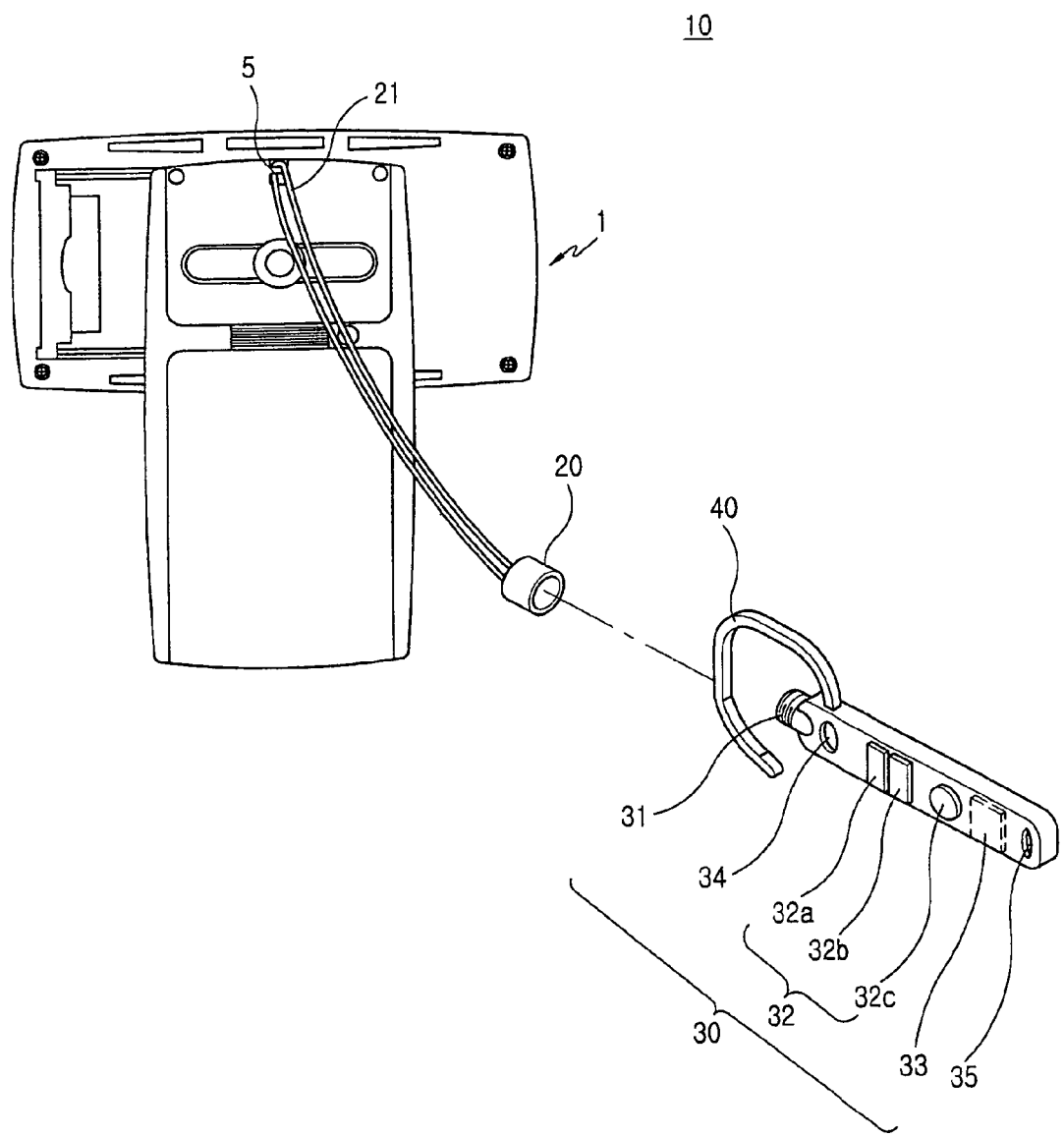
FIG. 1 is an exploded perspective view illustrating a remote controller with a hands-free function for a portable terminal according to a preferred embodiment of the present invention.
Figure 2:
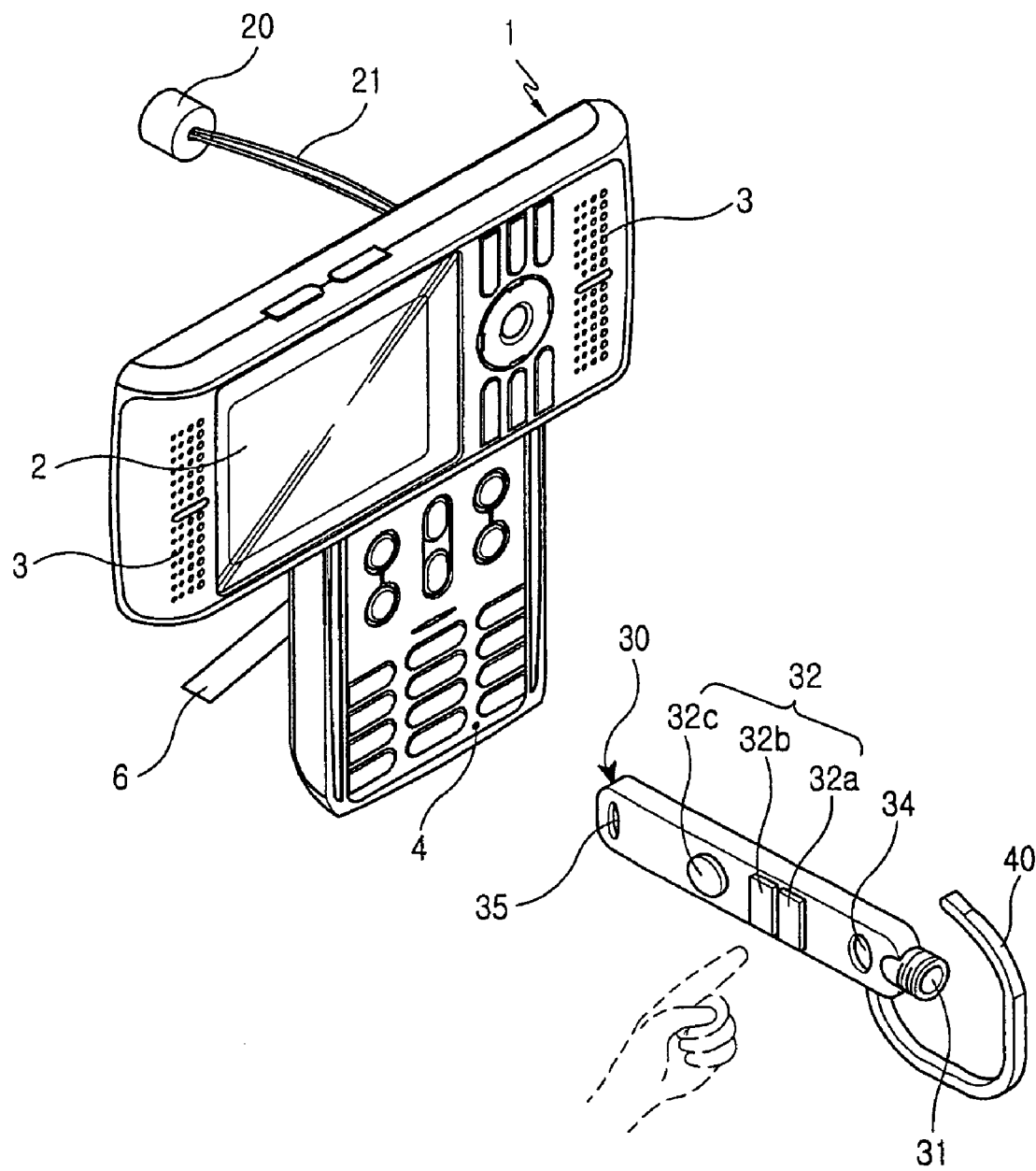
FIG. 2 is an exploded perspective view illustrating an operative state of a remote controller with a hands-free function for a portable terminal according to a preferred embodiment of the present invention.

As shown in FIGS. 1 and 2, a remote controller 10 with a hands-free function for a portable terminal 1 includes a connecting section 20 and a remote controller device 30. The connecting section 20 is provided in the portable terminal 1 so as to be capable of being attached to and being detached from the remote controller device 30. The remote controller device 30 has a hands-free unit, and can be attached to and being detached from the connecting section 20. The remote controller device 30 can select channels for watching TV and moving pictures of the portable terminal and control the volume of the speaker unit (not shown) of the portable terminal 1.

As shown in FIG. 1, a wire connecting section 21 is connected to the connecting section 20 and is mounted to the portable terminal 1. One end of the wire connecting section 21 is mounted to a ring 5 formed in the portable terminal 1, and the other end thereof is connected to the connecting section 20.

As shown in FIG. 2, the remoter controller section 30 includes a connecting member 31 and a key input section 32. The connecting member 31 is provided at one end of the remote controller device so as to capable of being attached to and detached from the connecting section 20 provided at one end of the portable terminal 1. The key input section 32 includes a plurality of keys for selecting various channels and controlling the volume of the terminal.

The connecting member 31 of the remote controller device 30 is assembled with the connecting section 20 by twisting the connecting number 31 and the connecting section 20.

As shown in FIG. 2, the key input section 32 includes a channel selecting key 32a, a volume controlling key 32b and a hands-free talk/end key 32c. The channel selecting key 32a is provided on the front surface of the remote controller device 30 and is used for selecting channels wirelessly for watching TV and moving pictures using the portable terminal 1. The volume controlling key 32b is provided on the front surface of the remote controller device and is used for controlling the volume of the portable terminal 1. The hands-free talk/end key 32c is provided on the front surface of the remote controller device 30 and is used for providing the portable terminal 1 with the hand-free function. A close-range communication module 33 (shown in FIG. 1) is used for transmitting and receiving signals wirelessly to and from the portable terminal 1 to perform the hands-free function. The close-range communication module 33 is embedded in the remote controller device 30 (as shown in FIG. 1).

The remote controller device 30 includes a speaker unit 34 and a microphone units 35 which are used to perform the hands-free function.

Figure 3:
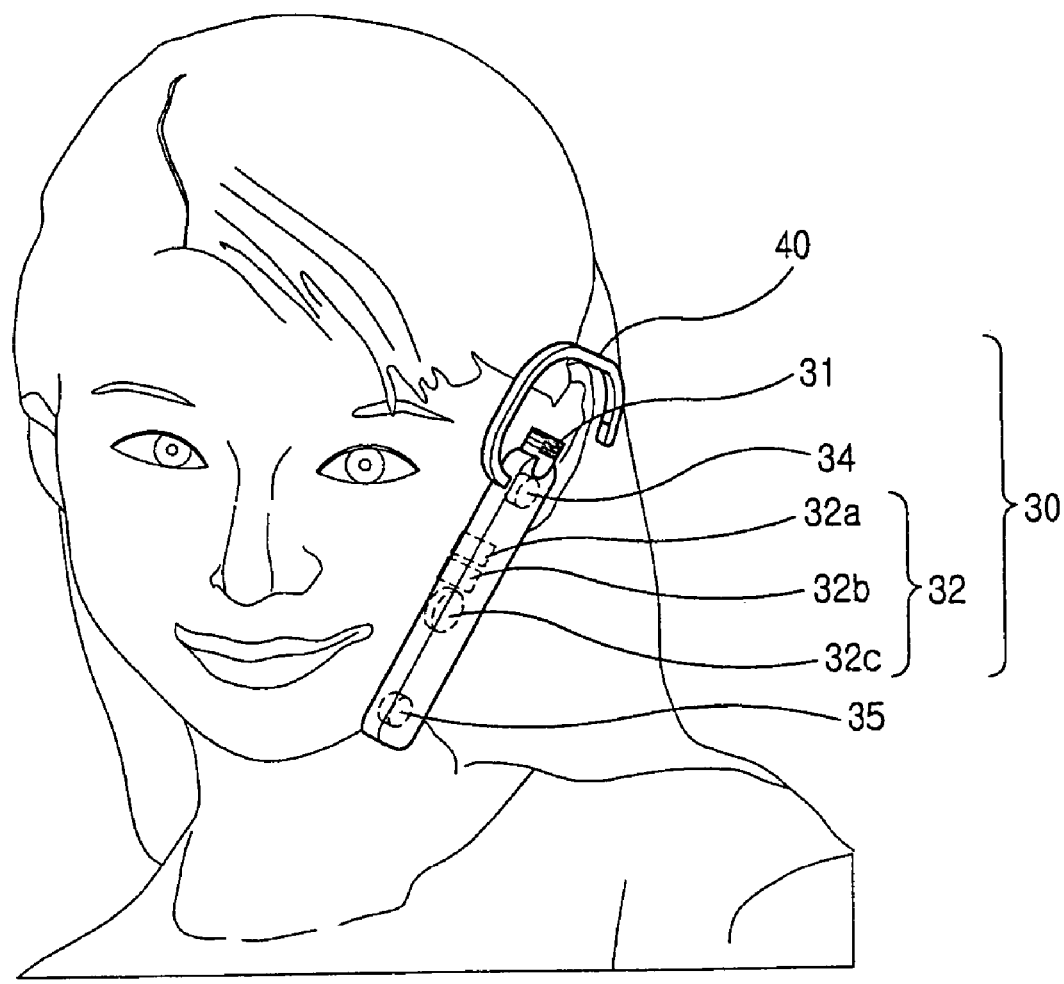
FIG. 3 is a perspective view illustrating a state in which a remote controller with a hands-free function for a portable terminal according to a preferred embodiment of the present invention performs the hands-free function.

As shown in FIG. 3, the remote controller device 30 includes a hook 40 for attaching the remote controlling device 30 to an ear of a user as shown.

The remote controller device 30 has a bar-like (e.g., a rectangular) shape so as to extend in the lengthwise direction thereof.

The connecting member 31, the speaker unit 34, the key input section 32, and the microphone unit 35 are sequentially disposed in the lengthwise direction of the remote controller device 30.

Hereinafter, the operation of the remote controller 10 with a hands-free function for the portable terminal, according to the preferred embodiment of the present invention will be described with reference to FIGS. 1 to 3.

As shown in FIG. 1, according to the remote controller 10 of the portable terminal 1, one end of the wire connecting section 21 is connected to the ring 5 formed in the portable terminal 1.

The connecting section 20 provided at the other of the wire connecting section 21 is assembled with the connecting member 31 of the remote controller device 30, preferably by screws.

In this state, if a user wants to watch TV through a liquid crystal display 2 of the portable terminal 1, the connecting member 31 of the remote controller device 30 which is attached to the connecting section 20 is rotated and thereby separated from the connecting section 20.

Then, as shown in FIG. 2, the portable terminal 1 is positioned in an upright position using an optional cradle 6, and the portable terminal 1 is used to provide a TV function.

Then, if a user wants to select (and/or change) a channel, the channel selecting key 32a of the key input section 32 depressed in the remote controller device 30.

Pressing the channel selecting key 32a, a user can find a desired channel and watch TV.

Then, if a user wants to turn up the volume when watching TV, the volume can be controlled by pressing the volume controlling key 32b of the key input section 32.

In this state, as shown in FIG. 3, if the portable terminal 1 receives an incoming phone call, a user can press the hands-free talk/end key 32c provided in the remote controller device 30, thereby enabling the user to talk wirelessly using the hands-free function. Then, the speaker unit 34 is located proximate to an ear of the user, a microphone unit 35 is located proximate to the mouth of the user, and the hook 40 is hung around an ear of the user and is used to position the remote controller device 30.

The close range communication module 33 is embedded in the remote controller device 30 so that the remote controller device 30 can communicate with the portable terminal 1 wirelessly to perform the hands-free function.

In this state, a user can both use the talking function of the portable terminal 1 and can simultaneously watch TV using the liquid crystal display 2 of the portable terminal 1.

In this state, if the hands-free talk/end key is pressed again, a phone call is ended and the remote controller device 30 can be used for providing a remote controller function.

Then, if the user is finished watching TV through the portable terminal 1, the connecting member 31 of the remote controller device 30 can be assembled with the connecting section 20 mounted to the portable terminal 1 to carry the remote controller 30 together with the portable terminal 1.

Further, it is also possible to turn down or mute the volume of the TV automatically if the hands-free talk/end key 32c is pressed to talk and to finish talking and restore to the volume, if the hands-free talk/end key 32c is pressed again.

As mentioned above, since the remote controller is mounted to the portable terminal, it can be easily carried. Further, as the remote controller is stored separately from the portable terminal, a separate container is not necessary and loss of the remote controller and can be prevented.

While a remote controller of a portable terminal according to the present invention has been shown and described with reference to a certain preferred embodiment thereof, it will be understood by those skilled in the art that various changes in form and detail may be made therein without departing from the spirit and scope of the invention as defined by the appended claims.

For example, the present invention can be applied to all the terminals which can be carried.

What is claimed is:

1. A remote controller with a hands-free function for a portable terminal including a liquid crystal display for watching television (TV) and moving pictures, a speaker unit capable of controlling the volume of the portable terminal, and a microphone unit, the remote controller comprising:
    a connecting section provided in the portable terminal; and
    a remote controller device having a hand-free unit and having an end for releasably coupling with the connection section, the remote controller device being capable of selecting channels for watching TV and moving pictures using the portable terminal and for controlling a volume level of the portable terminal.

2. A remote controller according to claim 1, wherein the portable terminal further includes a wire connecting section connected to both the connecting section and the portable terminal.

3. A remote controller according to claim 1, wherein the remote controller device includes:
    a connecting member provided at one end of the remote controller device for releasably coupling with the connecting section; and
    a key input section including a plurality of keys for selecting channels and controlling a volume level of a speaker unit.

4. A remote controller according to claim 1, wherein the connecting member of the remote controller device is releasably coupled with the connecting section by screws.

5. A remote controller according to claim 3, wherein the key input section includes a channel selecting key for selecting TV channels, a volume controlling key for controlling the volume level of the speaker unit, and a hands-free talk/end key for providing the portable terminal with a hands-free function.

6. A remote controller according to claim 1, further comprising:
    a close range communication module for transmitting and receiving signals wirelessly to and from the portable terminal to perform the hands-free function, the close range communication module being embedded in the remote controller device; and
    a speaker unit and a microphone unit to enable communication with the portable terminal using the remote controller device.

7. A remote controller according to claim 1, wherein the remote controller device further comprises a hook for locating the remote controlling device on an ear of a user.

8. A remote controller according to claim 1, wherein the remote controller device has a substantially rectangular shape extending in a lengthwise direction, wherein a connecting member, a speaker unit, a key input section, and a microphone unit are sequentially disposed in the lengthwise direction of the remote controller device.

9. A remote controller with a hands-free function for a portable terminal including a liquid crystal display, a speaker unit capable of controlling the volume of the portable terminal, and a microphone unit, the remote controller comprising:
    a connecting section provided in the portable terminal; and
    a device having a hands-free unit for performing a remote controlling function for selecting channels to watch TV and moving pictures of the portable terminal and for controlling a volume of the speaker unit.

* * * * *